May 3, 1932. L. W. JOHNSON 1,856,708
EXTENSION PILOT FOR REAMERS
Filed Feb. 9, 1928
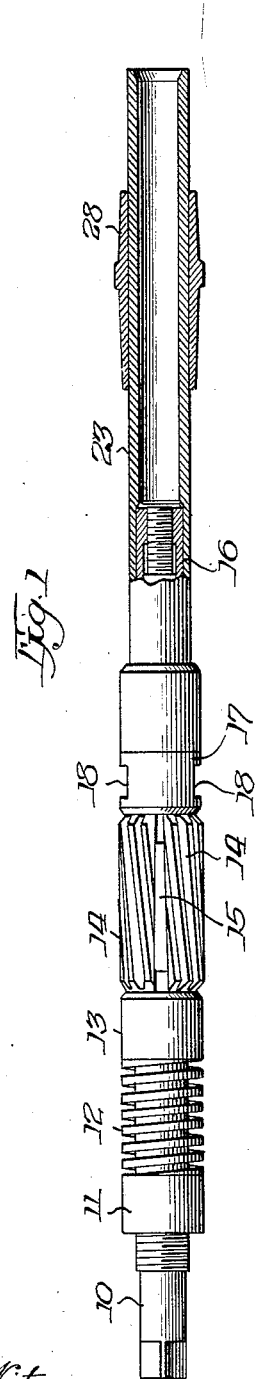
Inventor:
Leonard W. Johnson Patented May 3, 1932

1,856,708

UNITED STATES PATENT OFFICE

LEONARD W. JOHNSON, OF BATAVIA, ILLINOIS

EXTENSION PILOT FOR REAMERS

Application filed February 9, 1928. Serial No. 252,991.

My invention relates to extension pilots for reamers which are particularly adapted for use in connection with reamers used for boring out bearings in steering knuckles and the like where the bearings are spaced apart from each other a considerable distance, and in the wrist pin end of connecting rods for automobiles, where the bearings are reamed out while in the connecting rods usually in sets of two, which in each case the axes of the bearings must coincide in order to secure proper performance of the bearings when in assembled relation.

A further object of my invention is the provision of an extensible pilot for reamers which is so connected to the reamer shaft that the longitudinal axes of the reamer shaft and of the pilot coincide with each other.

In reaming out bearings the reamer must be made to work to extremely accurate measurements and the pilot or extension member must be made accurately enough to insure the reamer working to within 1/1000 of an inch tolerance, else the wrist pin will not be properly fitted in the bearings in either of the instances referred to above. The usual pilot member is a sleeve type, having an internally threaded portion which is adapted to engage the threaded end of a reamer member and the bearing shoulder of the reaming pilot member spaced apart from each other. In this construction the pivotal or bearing portions of the reamer and pilot member are so remote from each other that slight variation in the proper fit of these members or a slight looseness between these points results in a wide variation at the end of the pilot member, rendering the reamer useless for accurate work when the bearings are spaced from each other. If these points of connection are too close together the rigidity necessary for the successful operation of the device is lost, resulting in the extension pilot member fitting upon the pilot bushing of the reamer too loosely and destroying its effectiveness. In my improved structure I provide an extension member adapted to engage the usual pilot member in threaded relationship with an abutting engagement of the reamer and pilot only a short distance from the end of the extension pilot member, thereby providing a close fitting joint between these members with the contact surface, between the usual pilot member and the extension reamer, whereby the longitudinal axes of these two members coincide with each other.

These and other objects of my invention will be more fully and better understood by reference to the accompanying sheet of drawings and in which—

Figure 1 is a longitudinal view partially in elevation and partially in section of a reamer having an extension pilot mounted thereon;

Figure 2 is a longitudinal sectional view of the reamer and extension pilot shown in Figure 1; and Figure 3 is a longitudinal elevational view of the extension pilot member shown in Figures 1 and 2.

Referring now specifically to the drawings and in which like reference characters refer to like parts throughout, a reamer shaft 10 is shown having a bushing 11 in threaded engagement therewith and a spring 12 mounted thereon against a bushing 13, these members being movable longitudinally on the reamer shaft 10. A plurality of cutting blades 14, 14 is provided, these blades fitting into V-shaped recesses formed in the reamer shaft 10 and separated by blades 15, usually four in number, and projecting radially from the reamer shaft 10 at right angles to each other. A bushing 16 is provided which is threaded to the reamer shaft 10 at one of its ends. The bushing 16 has an enlarged portion 17 having wrench flats 18, 18 formed thereon by means of which the bushing 16 is turned up into engagement with the blades 14, the end of the bushing 16 adjacent the blades 14 being undercut as shown and adapted to fit over the sloping ends of the reamer blades 14, 14 whereby these members are held in proper relationship upon the reamer shaft 10.

The portion 17 of the bushing 16 has an annular sloping shoulder portion 19 formed thereon and an annular portion 20 adjacent thereto and an externally threaded portion 21 immediately adjacent the annular portion 20, this threaded portion 21 being of slightly larger diameter than the annular portion 20. The surface of the bushing 16 beyond the threaded portion 21 to the end thereof has a plurality of oil grooves 22 therein over which the extension pilot bushing hereinafter described, extends. An extension cylindrical pilot member, designated as a whole as 23, is provided, which has an enlarged end portion 24 of the same external diameter as the portion 17 of the member 16, the member 24 being internally threaded at 25 and having a smooth internal annular surface 26 with a sloping undercut end surface 27 adapted to cooperate with the surface 19 on the member 17, the annular surface 26 being out of engagement with the annular surface 20 on the member 17 and intermediate the end 27 and the threaded portion 25. A floating fit is provided between the outer end of the bushing 16 and the internal surface of the bushing 23, the grooves 22 having oil therein to enable these members to be properly and easily fitted together.

A tapered bushing 28 is provided into which the member 23 is received, this bushing being adapted to fit into the bearing opposite the one being reamed so that the member 23 is properly centered with respect to the bearing through which it extends. The bushing 16 is elongated sufficiently so that a tapered bushing similar to 28, although slightly less in internal diameter, can be inserted over the free end of this bushing and into a bearing when the connecting rods are placed close together and the extension member 22 is not needed. However, when it is impossible to place the connecting rods sufficiently close together and the extension member is needed, the reamer is placed through one wrist pin bearing and properly adjusted to ream out that bearing and the extension member 23 with the tapered bushing 28 placed in the bearing at the opposite side of the piston head so that the reamer is properly aligned with respect to the centers of the two bearings and the reamer run through the first bearing which is reamed out to the proper size. The reamer is then removed from the first bearing, its direction is reversed and it is placed in the second bearing with the pilot member 23 and bushing 28 positioned in the first bearing which has been reamed, and the second bearing reamed out, so that during the reaming operations the reamer is kept properly aligned with respect to the centers of the two bearings, and when completed the axes of the two bearings must coincide.

As the device is assembled, the extension pilot bushing 23 is slipped over the free end of the bushing 16 until the threaded portions 21 and 25 meet with each other, whereupon the members are screwed together so that the surfaces 19 and 27 are in snug fitting relationship with each other. The threaded portions of these two members are in engagement with each other at a slight distance from the end of the pilot member so that a secure connection is made between these two members which is sufficiently strong to withstand usage and which are yet not so far from each other as to allow for any variation in the exact fitting together of these two elements to cause a material variation in the outer or free end of the pilot member 22.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. Pilot means for reamers comprising in combination, a pilot bushing in engagement with the reamer shaft, the said bushing having a threaded portion intermediate its ends and an angular bearing surface adjacent said threaded portion, and a cylindrical extension pilot member having threaded portions and a bearing surface adapted to co-act with the threaded portions and bearing surface of the said pilot member.

2. Pilot means for reamers, comprising in combination, a pilot bushing having a threaded portion intermediate its ends and an enlarged portion at one end thereof forming a bearing surface for an extension pilot member, and a cylindrical extension pilot member adapted to pass over the end of the pilot bushing and having an internally threaded portion adjacent one end thereof but spaced apart therefrom and having an end bearing surface adjacent said threaded portion adapted to co-act with the bearing surface on said pilot bushing.

3. A pilot extension member for reamers, comprising a cylindrical member having an enlarged portion at one of its ends, the said enlarged end portion having an angularly disposed bearing surface, the said member being internally threaded intermediate its ends and having a larger internal diameter adjacent said bearing end than the diameter of said member throughout the balance of its length and having in addition an internal bearing surface which is cylindrical about the axis of the parts described.

4. Pilot means for reamers comprising in combination, a pilot bushing in engagement with the reamer shaft, said bushing having a threaded portion intermediate its ends, and a cylindrical extension pilot member having an internally threaded portion adjacent one of its ends and a bearing surface adjacent the threaded portion thereof but spaced toward said end from said threaded portion, the threaded portion of said pilot bushing and said extension member being interengaged and said bearing surface being adapted to coact with said pilot bushing.

5. Pilot means for reamers comprising in combination, a pilot bushing in engagement with the reamer shaft, said bushing having a threaded portion intermediate its ends and a bearing surface for an extension pilot, a cylindrical extension pilot member having an internally threaded portion adjacent one of its ends and a bearing surface adjacent the threaded portion thereof but spaced toward said end from said threaded portion, the bearing surfaces of the said pilot bushing and extension pilot member at the end of said pilot member being angularly disposed.

6. Pilot means for reamers comprising in combination, a pilot bushing in engagement with the reamer shaft, said bushing having a threaded portion intermediate its ends and an angular bearing surface for an extension pilot, and a cylindrical extension pilot member having an internally threaded portion adjacent one of its ends and a correspondingly angular bearing surface adjacent the threaded portion thereof but spaced apart from said threaded portion, the said bushing and said pilot extension member being out of contact with each other between the threaded portion and the angular bearing surface of the bushing.

7. Pilot means for reamers comprising in combination, a pilot bushing in engagement with the reamer shaft, said bushing having an angular bearing surface and a threaded portion intermediate its ends, the said bearing surface and threaded portion being spaced apart from each other, a cylindrical extension pilot member having an internally threaded portion adapted to coact with the threaded portion on said pilot bushing and a bearing surface at the end thereof adapted to coact in engagement with the bearing surface on said pilot bushing.

8. Pilot means for reamers including a bushing secured to a reamer shaft and having on its exterior a bearing surface, a threaded portion adjacent thereto, and an angularly disposed annular bearing surface on the opposite side, in combination with an extension pilot member having an angularly disposed bearing surface, internal screw threads and internal bearing surface so located as to coact with the corresponding portions of said bushing to properly align and rigidly secure said extension pilot member and said bushing.

9. Pilot means for reamers including a bushing secured to a reamer shaft and having on its exterior a substantially cylindrical bearing surface, a threaded portion adjacent thereto, and an angularly disposed annular bearing surface spaced therefrom on the opposite side, in combination with an extension pilot member having an angularly disposed bearing surface, internal screw threads spaced therefrom by a portion internally larger than the threaded portion, and internal bearing surface so located as to coact with the corresponding portions of said bushing to properly align and rigidly secure said extension pilot member and said bushing.

10. Pilot means for reamers including a bushing secured to a reamer shaft and having on its exterior a substantially cylindrical and angularly grooved bearing surface, a threaded portion adjacent thereto, and an angularly disposed annular bearing surface spaced therefrom on the opposite side, in combination with an extension pilot member having an angularly disposed bearing surface, internal screw threads spaced therefrom by a portion internally larger than the threaded portion, and internal bearing surface so located as to coact with the corresponding portions of said bushing to properly align and rigidly secure said extension pilot member and said bushing.

11. Pilot means for reamers comprising in combination, a pilot bushing in engagement with the reamer shaft, the said bushing having a threaded portion intermediate its ends and an angular bearing surface spaced slightly from said threaded portion, and a cylindrical extension pilot member having a threaded portion and an end bearing surface at the end of said extension pilot member adapted to co-act with the threaded portion and bearing surface of the said pilot member, the bore of the pilot extension member immediately adjacent the end bearing surface being larger in diameter than the bore of said member throughout the greater portion of its length and adapted to remain out of engagement with the bushing to which the said member is attached.

Signed at Chicago, Illinois, this 6th day of February, 1928.

LEONARD W. JOHNSON.